(12) United States Patent
Oezgen

(10) Patent No.: US 7,899,834 B2
(45) Date of Patent: Mar. 1, 2011

(54) METHOD AND APPARATUS FOR STORING AND MAINTAINING STRUCTURED DOCUMENTS

(75) Inventor: Markus Oezgen, Paulinenaue (DE)

(73) Assignee: SAP AG, Walldorf (DE)

( * ) Notice: Subject to any disclaimer, the term of this patent is extended or adjusted under 35 U.S.C. 154(b) by 406 days.

(21) Appl. No.: 11/021,789

(22) Filed: Dec. 23, 2004

(65) Prior Publication Data

US 2006/0155741 A1 Jul. 13, 2006

(51) Int. Cl.
G06F 7/00 (2006.01)
(52) U.S. Cl. ............... 707/758; 707/802; 707/E17.006; 707/E17.122
(58) Field of Classification Search ................. 707/102; 709/246; 715/513
See application file for complete search history.

(56) References Cited

U.S. PATENT DOCUMENTS

| | | | | |
|---|---|---|---|---|
| 5,448,727 A * | 9/1995 | Annevelink | ................. | 707/101 |
| 5,504,885 A * | 4/1996 | Alashqur | .................... | 717/141 |
| 5,596,744 A * | 1/1997 | Dao et al. | ..................... | 707/10 |
| 5,829,006 A * | 10/1998 | Parvathaneny et al. | ...... | 707/101 |
| 5,937,409 A * | 8/1999 | Wetherbee | ............. | 707/103 R |
| 6,061,515 A * | 5/2000 | Chang et al. | ................ | 717/114 |
| 6,078,926 A * | 6/2000 | Jensen et al. | ............ | 707/103 R |
| 6,122,627 A * | 9/2000 | Carey et al. | ..................... | 707/4 |
| 6,192,370 B1 * | 2/2001 | Primsch | .................. | 707/103 R |
| 6,374,256 B1 * | 4/2002 | Ng et al. | ................. | 707/103 R |
| 6,421,658 B1 * | 7/2002 | Carey et al. | ..................... | 707/2 |
| 6,542,900 B1 * | 4/2003 | Xia | ..................... | 1/1 |
| 6,611,843 B1 * | 8/2003 | Jacobs | ........................ | 707/102 |
| 6,643,633 B2 * | 11/2003 | Chau et al. | ..................... | 707/1 |
| 6,684,204 B1 * | 1/2004 | Lal | ............................... | 707/3 |
| 6,799,184 B2 * | 9/2004 | Bhatt et al. | .................. | 707/102 |
| 6,859,810 B2 * | 2/2005 | Andrei et al. | ............... | 707/102 |
| 6,925,477 B1 * | 8/2005 | Champagne et al. | ........ | 707/203 |
| 6,938,204 B1 * | 8/2005 | Hind et al. | ................... | 715/234 |
| 6,957,439 B1 * | 10/2005 | Lewallen | ..................... | 719/328 |
| 6,973,460 B1 * | 12/2005 | Mitra | ............................... | 1/1 |
| 7,096,229 B2 * | 8/2006 | Dettinger et al. | ............ | 707/102 |
| 7,133,880 B1 * | 11/2006 | Nori et al. | ............... | 707/103 R |
| 7,426,520 B2 * | 9/2008 | Gorelik et al. | .............. | 707/101 |
| 7,444,330 B2 * | 10/2008 | Bernstein et al. | ............... | 707/6 |
| 2002/0046394 A1 * | 4/2002 | Do et al. | ...................... | 717/108 |
| 2002/0112082 A1 * | 8/2002 | Ko et al. | ..................... | 709/246 |

(Continued)

FOREIGN PATENT DOCUMENTS

JP 2000155706 * 6/2000

OTHER PUBLICATIONS

Salminen et al., Requirements for XML Document Database Systems, Nov. 2001, ACM Press, pp. 85-94.*

(Continued)

*Primary Examiner*—Srirama Channavajjala
*Assistant Examiner*—Jessica N Le
(74) *Attorney, Agent, or Firm*—Buckley, Maschoff & Talwalkar LLC

(57) ABSTRACT

According to some embodiments, a method and apparatus for storing and maintaining structured documents includes identifying a structured document, decomposing the structured document into a plurality of nodes, each of the nodes representing a portion of information of the document, creating, for each of the nodes, a corresponding object, and loading each of the objects into a database system.

12 Claims, 5 Drawing Sheets

U.S. PATENT DOCUMENTS

| | | | | |
|---|---|---|---|---|
| 2002/0165739 | A1* | 11/2002 | Guyan et al. | 705/4 |
| 2003/0078902 | A1* | 4/2003 | Leong et al. | 706/59 |
| 2003/0144443 | A1* | 7/2003 | Gross et al. | 526/286 |
| 2003/0149934 | A1* | 8/2003 | Worden | 715/513 |
| 2003/0177443 | A1* | 9/2003 | Schnelle et al. | 715/513 |
| 2003/0182268 | A1* | 9/2003 | Lal | 707/3 |
| 2003/0208505 | A1* | 11/2003 | Mullins et al. | 707/102 |
| 2004/0064466 | A1* | 4/2004 | Manikutty et al. | 707/100 |
| 2004/0103105 | A1* | 5/2004 | Lindblad et al. | 707/100 |
| 2004/0167915 | A1* | 8/2004 | Sundararajan et al. | 707/100 |
| 2004/0168124 | A1* | 8/2004 | Beisiegel et al. | 715/513 |
| 2004/0199524 | A1* | 10/2004 | Rys et al. | 707/100 |
| 2005/0154705 | A1* | 7/2005 | Zwiegincew et al. | 707/1 |
| 2005/0166193 | A1* | 7/2005 | Smith et al. | 717/143 |
| 2005/0273768 | A1* | 12/2005 | Doughan | 717/136 |
| 2005/0278358 | A1* | 12/2005 | Doughan | 707/100 |
| 2006/0031233 | A1* | 2/2006 | Liu et al. | 707/100 |
| 2006/0190478 | A1* | 8/2006 | Owens et al. | 707/102 |
| 2008/0221916 | A1* | 9/2008 | Reeves et al. | 705/1 |

OTHER PUBLICATIONS

Sutherland et al., The Hybrid Object-Relational Architecture (HORA): An Integration of Object-Oriented and Relational Technology, Mar. 1993, ACM Press, pp. 326-333.*

Pardede et al., On Using Collection for Aggregation and Association Relationships in XML Object-Relational Storage, Mar. 2004, ACM Press, pp. 703-710.*

Anderson et al., Manageable Object-Oriented Development: Abstraction, Decomposition, and Modeling, Dec. 1991, ACM Press, pp. 199-212.*

Formica et al., An Efficient Method for Checking Object-Oriented Databases Scheme Correctness, Sep. 1998, ACM, vol. 23, Issue 3, pp. 333-369.*

Jamil et al., An Object-Oriented Extension of XML for Autonomous Web Applications, Nov. 2002, ACM, pp. 161-168.*

Grosso et al., XML Fragment Interchange, Feb. 12, 2001, http://www.w3.org/TR/xml-fragment.*

"XQuery 1.0: An XML Query Language", W3C Working Draft, Oct. 29, 2004. [Retrieved Dec. 15, 2004 9:24 AM]. Retrieved from Internet: URL: <http://www.w3.org/TR/xquery/> pp. 181.

Laux, Andreas and Martin, Lars, "XML:DB Initiative: XUpdate—XMX Update Language", Sep. 14, 2000. [Retrieved Dec. 15, 2004 9:40 AM] Retrieved from Internet: URL: <http://www.smb-tec.com/xmldb/xupdate-wd.html> 11pages.

"Oracle XML DB An Oracle Technical White Paper", Jan. 2004, Technical White Paper. 94 pages.

Jung, Frank, "XML Background", Aug. 2003, White Paper, Tamino XML Server, Software AG The XML Company. 12 pages.

* cited by examiner

METHOD AND APPARATUS FOR STORING AND MAINTAINING STRUCTURED DOCUMENTS

FIELD

Embodiments of the present invention relate to computing systems. More specifically, some embodiments relate to systems and methods for storing and maintaining structured documents, such as electronic documents formatted with a markup language.

BACKGROUND

The wide use of computing systems has led to the increased use of electronic documents. Many documents are structured documents and have a number of sections or fragments that may be referenced, viewed, or modified separately. As an illustrative example, this patent disclosure could be formatted as a structured, electronic document with a number of sections including the background, description, claims, etc. Many electronic documents are formatted or structured using a markup language such as the extensible markup language (XML).

There is an increasing need to be able to efficiently access, modify, search and otherwise manipulate these structured documents and the information contained in them. One solution is to store structured documents in relational databases based on the different tags associated with the document. Unfortunately, such a storage technique does not allow multiple users to access and modify portions of a stored document in parallel.

Accordingly, improved techniques for storing and maintaining structured documents are needed. It would be desirable to provide systems and methods for storing structured documents in a database system. It would further be desirable to provide systems and methods allowing multiple users to modify and update structured documents.

DETAILED DESCRIPTION

To alleviate problems inherent in the prior art, embodiments of the present invention introduce systems, methods, computer program code and means for storing and maintaining structured documents (e.g., such as documents structured using XML or the like). In some embodiments, processor-executable process steps are stored on a storage medium.

For convenience, clarity and ease of exposition, a number of terms are used herein. For example, the term "structured document" is used to refer to an electronic file of information, such as information representing a document or related information, where the information is tagged or formatted using a markup language such as XML (e.g., as described by the specifications maintained by the World Wide Web Consortium, including the specifications available at www.w3c.org). As used herein, the term "structured document" includes documents tagged or formatted using other markup or tagging schemes, now known or later developed.

As used herein, each structured document includes one or more "fragments" or "sections" defined by the markup language. As an illustrative example, if this patent disclosure were marked-up as a structured document using XML, it could include the following fragments: background, brief description of the drawings, detailed description, claims, and abstract. Pursuant to some embodiments, a "fragment" is a tagged section. In some embodiments, a "fragment" may be a portion of a tagged section (e.g., such as one paragraph of the background section of this patent application).

Figure 1:
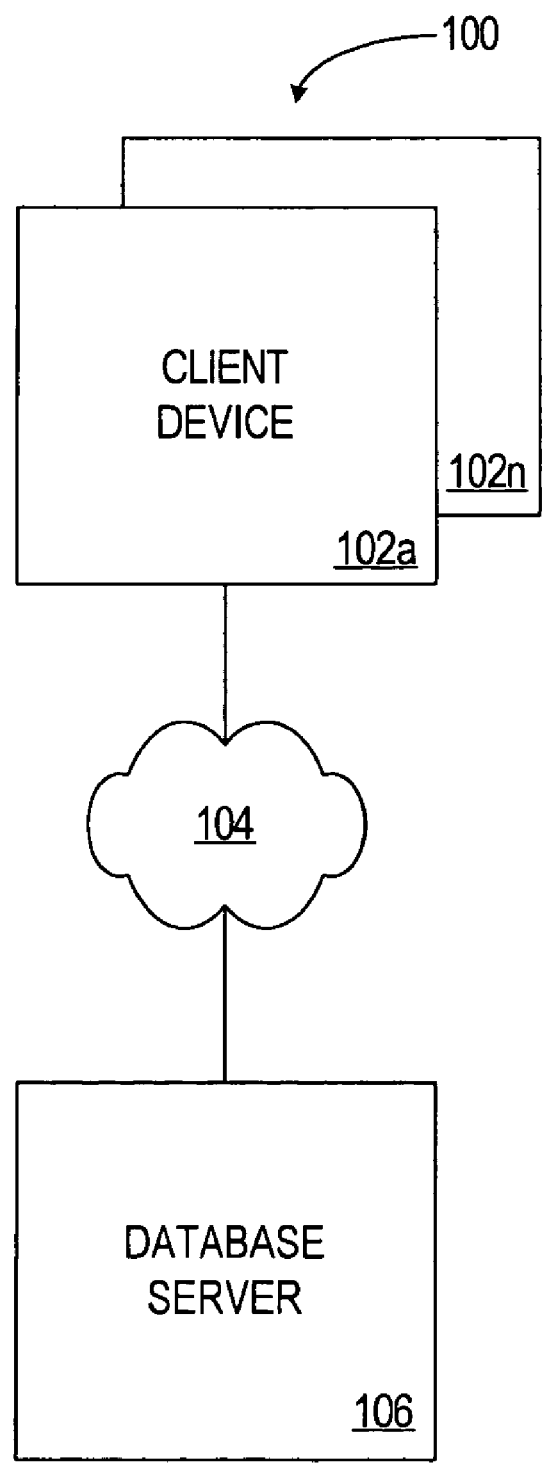
FIG. 1 is a diagram of a system utilizing features of some embodiments.

Features of embodiments will now be described by first referring to FIG. 1. FIG. 1 depicts a system 100 as one example of an environment in which features of the present invention may be implemented; those skilled in the art, upon reading this disclosure, will appreciate that features of the present invention may be implemented in a wide variety of computing systems.

System 100 includes one or more client devices 102*a-n* in communication with a database server 106 (or multiple servers) over a network 104. For example, client device 102 may be operated by a user to input, manipulate or interact with data stored in database server 106. Pursuant to some embodiments of the present invention, a user may operate client device 102 to input or enter fragments or items of data from structured documents into a database maintained by database server 106.

Database server 106, in some embodiments, is a hybrid object-relational database system such as the livecache® system offered by SAP AG, Inc. of Walldorf, Germany. As will be described further below, a hybrid object-relational database system allows the storage of data as objects (e.g., such as objects created as persistent C++ classes) as well as relational data (e.g., using a structured query language database system such as the MaxDB® database available from SAP AG, Inc and www.mySQL.com). Further details of one suitable database system are provided in U.S. Pat. No. 6,192,370, the contents of which are hereby incorporated by reference for all purposes.

As will be described further below, system 100 may be used to store fragments of structured documents as objects. Further, embodiments allow these objects to be easily stored, retrieved and modified, even when multiple users (e.g., operating client devices 102) attempt to access a structured document (or fragments thereof) in parallel. Other features and advantages will become apparent to those skilled in the art upon reading the following disclosure.

Figure 2:
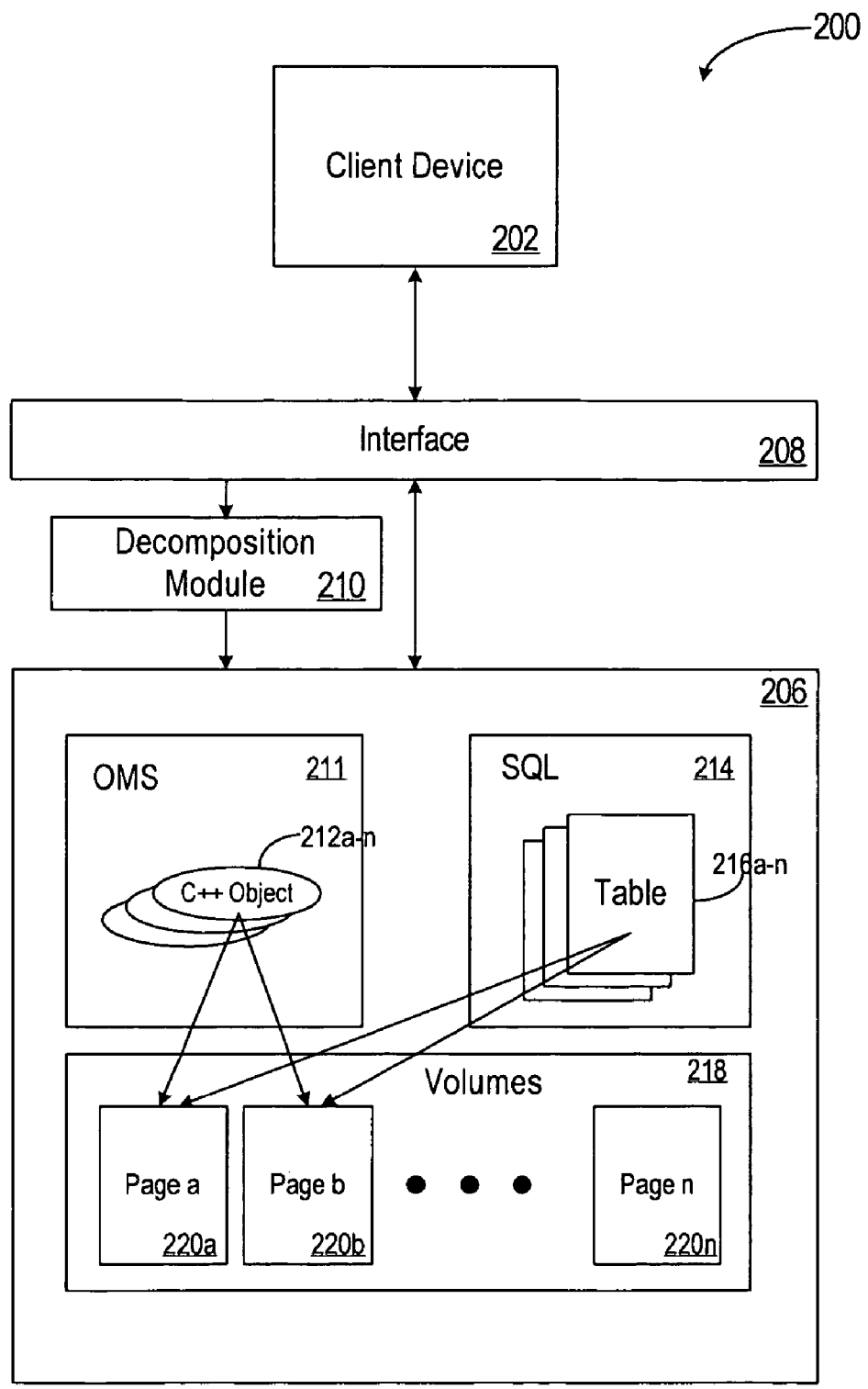
FIG. 2 is a further diagram of a system utilizing features of some embodiments.

Referring now to FIG. 2, a system 200 is shown which includes a client device 202 in communication with a database server 206 through an interface 208. This communication may be over one or more network connections. For example, in some embodiments, system 200 is implemented in a TCP/IP environment, and interaction between client device 202, interface 208 and database server 206 is performed using the hypertext transport protocol ("HTTP") or similar protocols. Client device 202 may be operated by a user (e.g., such as a database user interested in submitting queries or retrieving information from database server 206), or may be operated by a service or other computing routine (e.g., to interact with database server 206 on behalf of an application program or the like).

Interface 208 is configured to facilitate communication between client device 202, decomposition module 210 and database server 206, and may be implemented using any of a number of technologies. For example, in one illustrative embodiment, interface 208 is implemented using the Java® JDBC application programming interface, and allows client device 202 to present structured query language ("SQL") queries and commands to database server 206 (and to receive SQL responses from the server). Interface 208 may also be configured to identify requests to submit new structured documents to the database server and to process new structured documents using a decomposition module 210.

Decomposition module 210 may be implemented as a software module or code configured to receive an input structured document (e.g., input or transmitted from a user operating client device 202), decompose the structured document into one or more nodes, create, and persist at least one C++ (or other object-oriented programming language) object for each node. In some embodiments, (such as those implemented to decompose documents formatted using the XML specifications available at www.w3c.org) processing of an element node includes creating and persisting additional objects to contain attributes of the element node so that parts of an element node can be updated in parallel.

The objects created by decomposition module 210 are provided to database server 206 for storage. Pursuant to some embodiments, a user operating client device 202 may interact with interface 208 to choose to upload or submit a new structured document for storage in database system 206. For example, the user may be presented with a user interface or a menu of options providing instructions to upload or submit a file containing a new structured document. Pursuant to some embodiments, this interaction may be automated, such that the user need only select a structured document for upload or submission.

Decomposition module 210., in some embodiments, is configured to identify the tagging or coding scheme associated with the structured document submitted from client device 202 and to decompose the document into one or more nodes. The module, in some embodiments, is further configured to create a C++ object (or other object oriented programming language object) for each node as will be described further below. These object representations of each fragment or portion of the structured document are provided to database system 206 for storage.

Pursuant to some embodiments, decomposition module 210 is implemented using a high level language such as C++. In some embodiments, the decomposition module 210 is implemented as a part of database server 206. Pursuant to some embodiments, decomposition module 210 is coded using Java® and is implemented as a servlet, although those skilled in the art will recognize that the decomposition module may be implemented as a separate module from database server 206 and/or may be implemented using a number of different software technologies. For example, decomposition module 210 may be configured to execute C++ functions including CREATE and STORE, etc.

Pursuant to some embodiments in which structured documents formatted using XML are processed, processing by decomposition module 210 may take advantage of the XPATH and XQUERY and other related standards (e.g., maintained and made available at www.w3c.org) to address parts of an XML document. For example, XPATH may be used to address parts of an XML document by referring to the document as a tree of nodes and location paths. As will be described further below, this information, along with object identifiers assigned by system 200, are used to store and maintain documents pursuant to embodiments disclosed herein.

In general, decomposition module 210 operates to decompose an input structured document into a number of component pieces and maps those pieces to a number of objects (e.g., such as C++ objects) that can later be updated in parallel using a database system. If the entire structured document were persisted as one object, only one user could lock and update the document. Embodiments allow the structured document to be split (or "decomposed") into sections or fragments, allowing different users to access and edit separate paragraphs. Further, embodiments allow these individual objects to be persisted in a database system so that they can be easily searched, retrieved, edited, or otherwise manipulated. Embodiments allow structured documents to be stored in a database system without need for a special database schema designed to receive and store components of the document.

Database server 206, in some embodiments, including the embodiment depicted in FIG. 2, is a hybrid object-relational database system such as the livecache® system, and includes a object management system ("OMS") 211 and a structured query language (SQL) component 214, each accessing data stored in data storage volumes 218. For example, data may be stored in volumes 218 as pages 220a-n of information. Pursuant to some embodiments, object data are stored in pages 220a-n of memory. Each object is identified with an Object Identifier ("Oid") that identifies the page on which the object is stored. The OMS tracks these Oids, and each object's location in memory. The OMS regards the memory as a logical collection of page sets, each one consisting of a collection of fixed size pages. Each page chain corresponds to a particular set of objects stored according to an object class.

Pursuant to some embodiments, the Oid of each of the primary objects (e.g., such as the objects representing an element node of a structured document) are stored in traditional relational format in tables 216 a-n to allow database server 206 to identify and retrieve portions of a structured document. Pursuant to some embodiments, the Oid for additional object instances may be stored in traditional relational format in tables 216a-n. As an example, a relational table may be provided which includes a column storing an object's Oid, and other columns to store one or more object attributes. Relationships between objects are identified by OMS 211 using information persisted in each object.

Pursuant to some embodiments, when object data is retrieved from storage or updated by OMS 211, transaction management processes are used to provide a consistent view of the object data and avoid collisions between competing updates respectively. For example, if two users (e.g., operating two separate client devices 202a and 202b) attempt to simultaneously modify or update a fragment of a structured document (e.g., represented by the same object stored in database server 206), embodiments ensure that both updates are managed so the database is not left in an inconsistent state. Pursuant to some embodiments, the OMS 211 manages such transaction management with two SQL operators: COMMIT and ROLLBACK.

The COMMIT transaction signals a successful end-of-transaction. It tells OMS 211 that a logical unit of work (such as an update to an object) has been successfully completed, the database is in a consistent state again, and all of the updates made by that unit of work can now be committed or made permanent. The ROLLBACK transaction signals an unsuccessful end-of-transaction: it tells OMS 211 that something has gone wrong, the database might be in an inconsistent state, and all of the updates made by the logical unit of work so far must be "rolled back" or undone. If either of the two updates raises an error condition, a ROLLBACK is issued to undo any changes made so far. For example, in some embodiments, OMS 211 maintains a log (not shown) in which details of all update operations—in particular, before and after values of the updated object—are recorded. Thus if it becomes necessary to undo some particular update, OMS 211 can use the corresponding log entry to restore the updated object to its previous value. Pursuant to some embodiments, each object (or its updated content) is not made visible to other users of the database system until the transaction in which the object has been created or updated has been "committed". For example, this may be managed by providing consistent views of each object.

Those skilled in the art will appreciate that the use of other transaction management techniques and operators may also be used.

Figure 3:
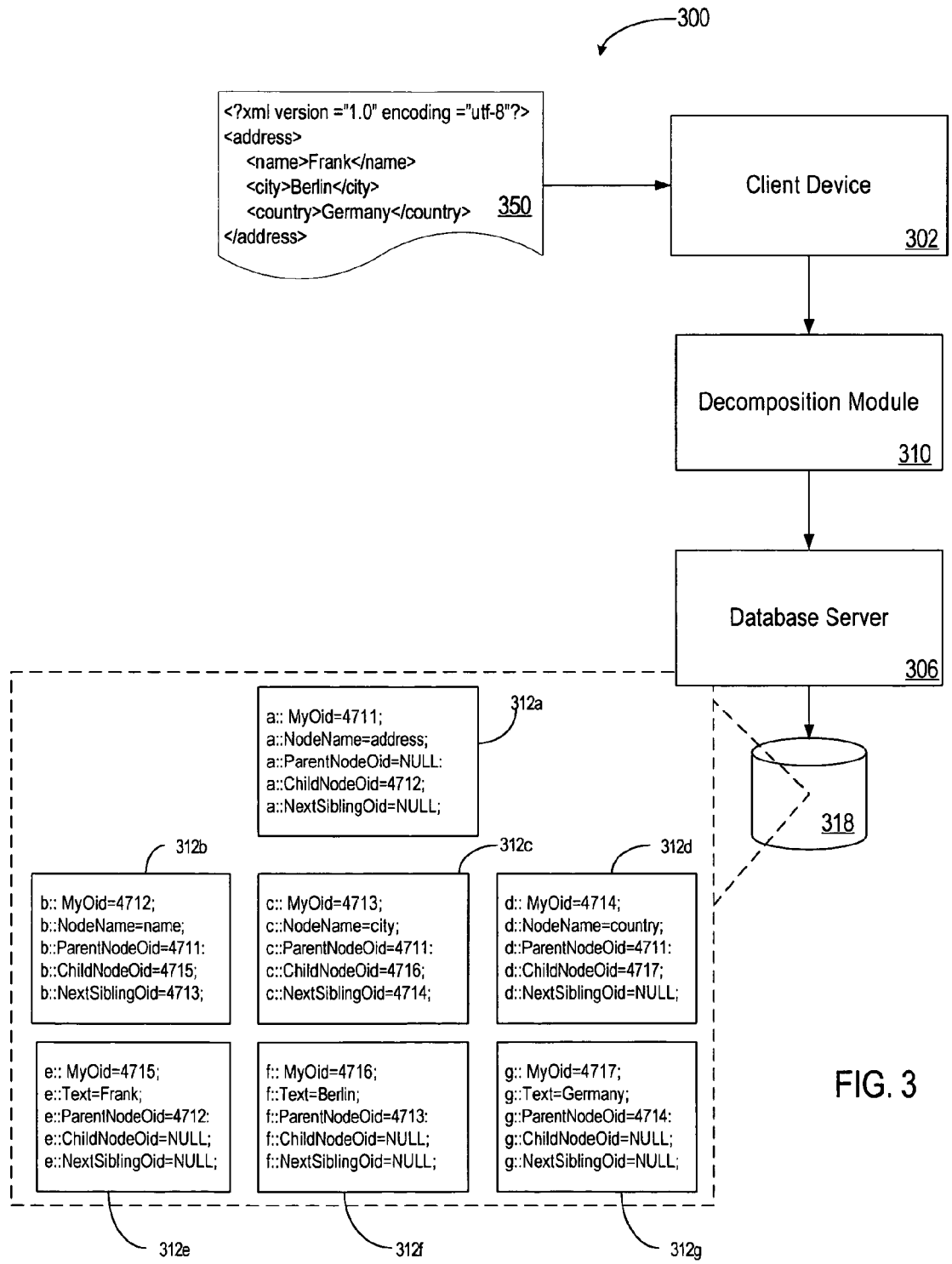
FIG. 3 is a further diagram of a system utilizing features of some embodiments.

Reference is now made to FIG. 3. FIG. 3 depicts a system 300 including an input structured document 350 and an output set of objects 312a-g stored in data storage volume(s) 318 of database server 306. As shown, the uploading or input of a structured document into a database system, pursuant to some embodiments, involves interaction between a client device 302, a decomposition module 310 and a database server 306. One or more interfaces (not shown) may also be involved (e.g., as discussed in conjunction with FIG. 2 above). Structured document 350 may be an electronic file formatted using a markup language. As shown, the document 350 is formatted as an XML document using XML version 1.0. Structured document 350 is shown with an illustrative example, where the document includes an address portion having three tagged nodes: a name, a city, and a country.

A user operating client device 302 may upload or submit structured document 350 to database server 306 over a network interface. In particular, the document is provided to decomposition module 310 for processing (either directly or via an interface as described in FIG. 2). Decomposition module decomposes structured document 350 into a set of related nodes. In the illustrative example, the structured document is decomposed into seven nodes: four element nodes (address, name, city, and country), and three text nodes (Frank, Berlin, and Germany). Decomposition module 310 creates C++ objects representing each of these nodes. Each of the C++ objects includes a object identifier ("Oid") and information defining the relationship of the object with the other objects created based on structured document 350. These objects, and their relationships, are stored in data storage volume(s) 318 accessible by database server 306.

The set of objects 312a-g created based on the example input document 350 is shown in FIG. 3. As shown, the seven objects include four element nodes, having Oids 4711-4714, and three text nodes having Oids 4715-4717. Each object 312 includes information identifying its relationship to other objects created based on the structured document 350. Each object 312 may be separately retrieved and manipulated using database server 306.

As shown in FIG. 3, an input document 350 has been decomposed into seven different objects (one for each node in the document), each having an Oid and each having relationship information defining the node's relationship with other nodes in the document (e.g., such as parent, sibling, child, or the like). In some embodiments, using this relationship information, and using the XPATH and XQUERY standards maintained at www.w3c.org, every part of an XML document can be addressed.

After a structured document has been decomposed and stored as a series of objects in database server 306, users may interact with database server 306 to retrieve, view, update and modify portions of the structured document. From the perspective of a user operating a client device, the data manipulation is a typical database interaction. This database interaction (and the ability to allow multiple users access fragments of the same structured document in parallel, will be described further below in conjunction with FIG. 5.

Figure 4:
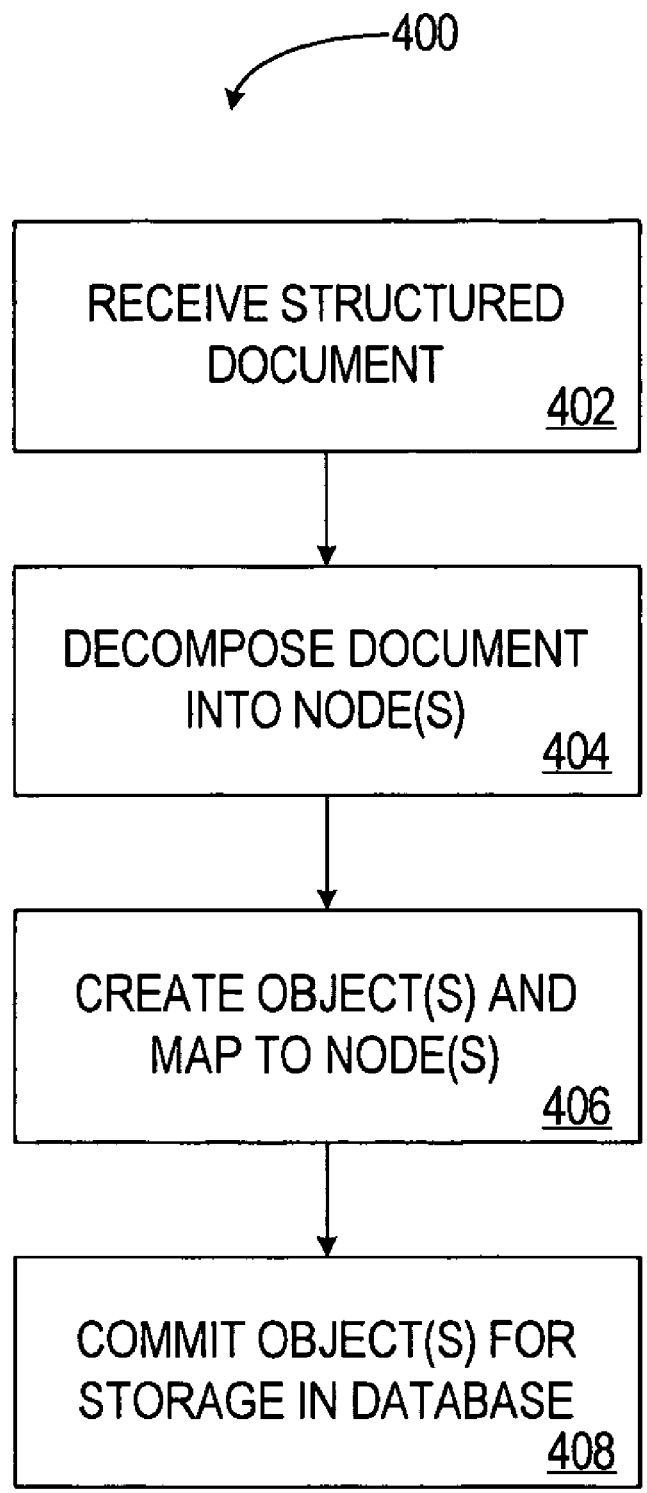
FIG. 4 is a flow diagram pursuant to some embodiments.

Referring now to FIG. 4, a flow diagram is shown depicting a process 400 for creating one or more objects from a structured document pursuant to some embodiments. The process depicted in FIG. 4 (and other processes described herein) does not imply a fixed order to the process steps, and embodiments of the present invention may be performed in any order that is practicable.

Process 400 beings at 402 where a structured document is received. For example, referring to the system 200 of FIG. 2, the structured document may be transmitted from a user operating client device 202 over a network to interface 208 for loading into database system 206. For example, the user may interact with a user interface to identify the structured document for loading into database system 206.

Once the structured document has been received, processing continues at 404 where the structured document is decomposed into one or more nodes. For example, if the document is structured or tagged using the XML standard, XML Parser software may be used to decompose the structured document into one or more nodes as defined by the XML standard and as described further above.

Processing continues at 406 where the nodes created at 404 are mapped and persisted to C++ objects (or other object oriented language objects) for storage in database system 206. In some embodiments, database system 206 is a hybrid object-relational database system, and processing at 406 includes creating each object with a unique Oid identifying a storage location for each object, as well as creating additional entries in a relational table to associate the Oids of the document's anchor objects with relational data to get a relationship between the decomposed XML documents and other relational data.

Processing continues at 408. Once objects have been created for each of the nodes of the structured document and the objects have been mapped and persisted, the objects are committed for storage in the database system. That is, after completion of processing at 408, users may interact with the database system to search for, retrieve, and modify fragments of a structured document that are stored in the database system. As will be described further below in conjunction with FIG. 5, pursuant to some embodiments, multiple users are able to search, retrieve, modify and otherwise manipulate the same structured document in parallel.

Figure 5:
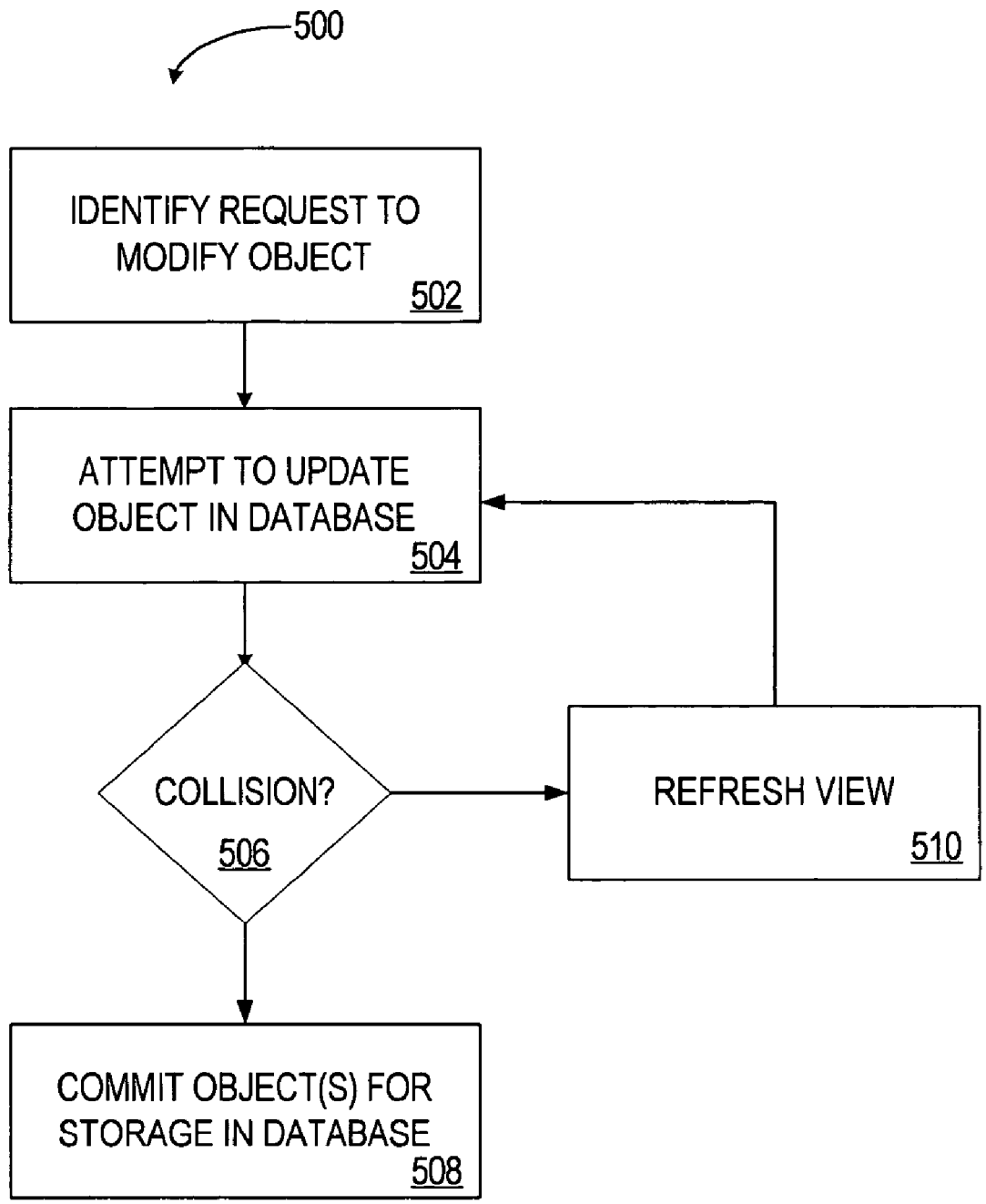
FIG. 5 is a further flow diagram pursuant to some embodiments.

Referring now to FIG. 5, a flow diagram is shown depicting a process 500 for updating an object in a database pursuant to some embodiments. Processing begins at 502 when a request to modify an object is identified. For example, referring to the components of FIG. 2, processing at 502 may include interaction between a user operating a client device 202 and database server 206. The user may interact with database server 206 via a user interface allowing the user to query, view, modify, and otherwise manipulate data stored in database server 206. Processing at 502 may be the result of a query submitted by the user to view a portion of a structured document stored in database server 206. In the transaction of FIG. 5, the user desires to modify some aspect of a portion of the structured document (that is, the user is attempting to modify an object associated with the structured document). From the user's perspective, processing at 502 may simply include editing text or other attributes associated with an object, and attempting to submit the edited object to the database system. From the perspective of the database system, processing at 502 may include receiving a modify or update request associated with a particular object.

Processing at 504 includes processing by the database system to attempt to update or modify the object in the database system. Pursuant to some embodiments, processing at 504 includes performing transaction management to identify whether updating the data would create a collision with another update or modification of the same object. Embodiments allow multiple users to access data in parallel, this parallel access can result in potential collisions. Processing at 504 operates to avoid collisions. For example, in some embodiments, processing at 504 includes determining whether any other transactions have modified the object during the same time period. This determination may include consulting a transaction log or other table to determine if the object has changed in any way since the object was retrieved for the user, and prior to receiving the request to modify at 502.

Processing continues at 506 where a determination is made whether completion of the modify request received at 502 will result in a collision with another modification of the same object. If so, processing continues at 510 where the view of the object is refreshed. In some embodiments, (as shown) processing continue at 504 where a further attempt is made to update the database (e.g., if the new view of the object still matches the initial request, the database may be updated). In some embodiments, the update may fail and the user may be notified. If desired, the user may elect to resubmit the same modification request, or the user may terminate or modify the request.

If processing at 506 indicates that completion of the modification request received at 502 will not result in a collision, processing continues at 508 where the modified object is committed to the database. That is, the modifications are entered into the database and the modified object is available for viewing, further modification or other manipulation by users of the database system. In this manner, embodiments allow multiple users to store, retrieve, modify, and otherwise manipulate the same structured document in parallel. For example, multiple users can interact with a database system pursuant to the invention to work on the same structured document. The transaction management and database techniques of the present invention ensure data consistency and availability.

Although the present invention has been described above with respect to some embodiments thereof, it should be noted that the above-described embodiments may be altered to create completely or partially different embodiments without departing from the spirit and scope of the appended claims.

For example, although some embodiments have been described herein as relating to the processing, storage and maintenance of structured documents formatted using XML, those skilled in the art will recognize that features of embodiments may be used to process, store and maintain structured documents formatted using other markup languages or techniques.

What is claimed is:

1. A computer-implemented method, comprising:
   identifying a structured document that is formatted using a markup language and includes a plurality of fragments as defined by the markup language;
   decomposing said structured document into a plurality of nodes, each of said nodes corresponding to at least a portion of said plurality of fragments of said structured document as defined by the markup language;
   creating, for each of said nodes corresponding to at least a portion of said plurality of fragments of said structured document, at least one persistence of a corresponding object oriented programming language object, each of said created objects including a unique object identifier identifying a storage location for each object and information defining a relationship between itself and at least one other object oriented programming language object created for the structured document;
   loading each of said objects into a hybrid object-relational database system, the loading including storing object data including the information defining the relationship between the object and at least one other object oriented programming language object created for the structured document for each of said objects in an object management system component of said hybrid object-relational database system, and storing the object identifier of each of said objects in a relational table of a structured query language component of said hybrid object-relational database system;
   providing simultaneous access to a plurality of users to modify same nodes of said structured document; and
   manipulating, in parallel, a plurality of said object oriented programming language objects loaded in said hybrid object-relational database corresponding to said simultaneously accessed same nodes of said structured document.

2. The method of claim 1, wherein at least one of said nodes is an element node and said node information includes a node name.

3. The method of claim 1, wherein at least one of said nodes is a text node and said node information includes text.

4. The method of claim 1, wherein each object identifier identifies a page in a memory on which the corresponding object is stored.

5. The method of claim 4, wherein a relational table stores information identifying at least a first object identifier.

6. The method of claim 1, further comprising:
   identifying a request to modify a first one of said objects;
   retrieving said first object from said hybrid object-relational database system;
   modifying said first object and creating a modified object; and
   determining whether said modified object is able to be stored in said database to replace said first object.

7. The method of claim 6, further comprising:
   identifying a second request to modify said first one of said objects;
   retrieving said first object from said hybrid object-relational database system;
   modifying said first object and creating a second modified object; and
   determining whether said second modified object is able to be stored in said database to replace said object.

8. The method of claim 7, wherein said determining further comprises:
   determining that said first object was modified during a period after said first object is retrieved in response to said second request; and
   determining that said second modified object is not able to be stored in said database to replace said object.

9. An apparatus, comprising:
   a memory storing processor-executable instructions; and
   a processor in communication with the memory and operative in conjunction with the stored instructions to:
      identify a structured document that is formatted using a markup language and includes a plurality of fragments defined by the markup language;
      decompose said structured document into a plurality of nodes, each of said nodes corresponding to at least a portion of said plurality of fragments of said structured document as defined by the markup language;

create, for each of said nodes corresponding to at least a portion of said plurality of fragments of said structured document, at least one persistence of a corresponding object oriented programming language object, each of said created objects defining a relationship between itself and at least one other object oriented programming language object as defined by the markup language;

load each of said objects into a hybrid object-relational database system, the loading including storing object data including the information defining the relationship between the object and at least one other object oriented programming language object created for the structured document for each of said objects in an object management system component of said hybrid object-relational database system, and storing the object identifier of each of said objects in a relational table of a structured query language component of said hybrid object-relational database system;

provide simultaneous access to a plurality of users to modify same nodes of said structured document; and manipulate, in parallel, a plurality of said object oriented programming language objects loaded in said hybrid object-relational database corresponding to said simultaneously accessed same nodes of said structured document.

10. A storage medium storing processor-executable instructions thereon, the medium comprising:

instructions to identify a structured document that is formatted using a markup language and includes a plurality of fragments defined by the markup language;

instructions to decompose said structured document into a plurality of nodes, each of said nodes corresponding to at least a portion of said plurality of fragments of said structured document as defined by the markup language;

instructions to create, for each of said nodes corresponding to at least a portion of said plurality of fragments of said structured document, at least one persistence of a corresponding object oriented programming language object, each of said created objects defining a relationship between itself and at least one other object oriented programming language object created for the structured document;

instructions to load each of said objects into a hybrid object-relational database system, the loading including storing object data including the information defining the relationship between the object and at least one other object oriented programming language object created for the structured document for each of said objects in an object management system component of said hybrid object-relational database system, and storing the object identifier of each of said objects in a relational table of a structured query language component of said hybrid object-relational database system;

instructions to provide simultaneous access to a plurality of users to modify same nodes of said structured document; and instructions to manipulate, in parallel, a plurality of said object oriented programming language objects loaded in said hybrid object-relational database corresponding to said simultaneously accessed same nodes of said structured document.

11. The medium of claim 10, wherein each of said objects is managed by an object management system of a database server.

12. The medium of claim 10, further comprising: instructions to determine whether a request to update said objects is to be committed.

* * * * *